US007991950B2

(12) United States Patent
Li et al.

(10) Patent No.: US 7,991,950 B2
(45) Date of Patent: *Aug. 2, 2011

(54) APPARATUS AND METHOD FOR INCREMENTAL PACKAGE DEPLOYMENT

(75) Inventors: Cong Li, Shanghai (CN); Jun J. Wang, Shanghai (CN); Jianfeng Mei, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/484,020

(22) Filed: Jun. 12, 2009

(65) Prior Publication Data

US 2009/0254723 A1    Oct. 8, 2009

Related U.S. Application Data (63) Continuation of application No. 11/027,870, filed on Dec. 29, 2004, now Pat. No. 7,613,875.

(51) Int. Cl.
*G06F 12/00* (2006.01)

(52) U.S. Cl. ........ 711/112; 711/154; 717/162; 717/173; 717/178

(58) Field of Classification Search ................... 711/112
See application file for complete search history.

(56) References Cited

U.S. PATENT DOCUMENTS

| | | | |
|---|---|---|---|
| 5,799,147 A | 8/1998 | Shannon | |
| 5,860,012 A | 1/1999 | Luu | |
| 6,052,531 A | 4/2000 | Waldin et al. | |
| 6,487,718 B1 | 11/2002 | Rodriguez et al. | |
| 6,513,093 B1 | 1/2003 | Chen et al. | |
| 6,785,786 B1 | 8/2004 | Gold et al. | |
| 7,613,875 B2 * | 11/2009 | Li et al. .................. | 711/112 |
| 2002/0023225 A1 | 2/2002 | Lomnes | |
| 2002/0116404 A1 | 8/2002 | Cha et al. | |
| 2003/0069951 A1 | 4/2003 | Fong et al. | |
| 2003/0182414 A1 | 9/2003 | O'Neill | |
| 2006/0047927 A1 | 3/2006 | Xing et al. | |

OTHER PUBLICATIONS

Finley, Brian Elliott et al., "System Imager v3.0.O Manual," Nov. 10, 2002.*
"Recovery Card User's and Reference Manual," Winter Consultant Company, Dec. 18, 2003, http://web.archive.org/web/20031218045719/http://www.winter-con.com/download.html.*
Finley, Brian Elliott et al., "SystemImager v3.0.0 Manual," Nov. 10, 2002.

(Continued)

*Primary Examiner* — Kevin L Ellis
*Assistant Examiner* — Kalpit Parikh
(74) *Attorney, Agent, or Firm* — Blakely, Sokoloff, Taylor & Zafman LLP (57) ABSTRACT

A method and apparatus for incremental package deployment are described. In one embodiment, the method includes the redirection of disk input/output (I/O) requests to preserve contents of disk memory. Following redirection of the disk I/O request, a software distribution package is created according to disk I/O write requests redirected to unused blocks of disk memory. In one embodiment, the software distribution package is generated using a firmware agent, which uploads the software distribution package to a server, which provisions the software distribution packet to other computers within a uniform environment to ensure that each system within the uniform environment has an identical system and memory image. Other embodiments are described and claimed.

21 Claims, 7 Drawing Sheets

OTHER PUBLICATIONS

"Recovery Card User's and Reference Manual," Winter Consultant Company, Dec. 18, 2003, http://web.archive.org/web/20031218045719/http://www.winter-con.com/download.html.
Non-Final Office Action mailed Mar. 28, 2007 for U.S. Appl. No. 11/027,870.
Final Office Action mailed Aug. 20, 2007 for U.S. Appl. No. 11/027,870.
Non-Final Office Action mailed Jan. 25, 2008 for U.S. Appl. No. 11/027,870.
Final Office Action mailed Jul. 21, 2008 for U.S. Appl. No. 11/027,870.
Non-Final Office Action mailed Nov. 10, 2008 for U.S. Appl. No. 11/027,870.
Final Office Action mailed Mar. 13, 2009 for U.S. Appl. No. 11/027,870.
Notice of Allowance mailed Sep. 22, 2009 for U.S. Appl. No. 11/027,870.

* cited by examiner

APPARATUS AND METHOD FOR INCREMENTAL PACKAGE DEPLOYMENT

CROSS REFERENCE

The present patent application is a Continuation of, and claims priority to and incorporates by reference, the corresponding U.S. patent application Ser. No. 11/027,870, entitled, "APPARATUS AND METHOD FOR INCREMENTAL PACKAGE DEPLOYMENT" filed on Dec. 29, 2004, and issued as U.S. Pat. No. 7,613,875 on Nov. 3, 2009.

FIELD

One or more embodiments relate generally to the field of data processing and information technology. More particularly, one or more of the embodiments relate to a method and apparatus for incremental package deployment.

BACKGROUND

The state of a computer, usually determined by which programs are running and basic hardware and software characteristics, refers to the computer's environment. One ingredient of a computer environment is the operating system. However, operating systems include a number of different parameters. In addition, the environment maybe an area in memory that the operating system and other programs use to store various types of miscellaneous information. All these elements taken together constitute the computer environment.

Recently, the advent of Internet cafes, as well as the ongoing problem of maintaining computer networks, has led to increased efforts to provide uniform environments. As described herein, the term "uniform environment" refers to computer networks wherein the software configuration installed on one or more client computers within the computer network is identical. System provisioning is an important requirement in uniform environments in which the same software configuration is installed on one or more client computer within a computer network.

As described herein, the term "system provisioning" refers to a technique for deploying the software configuration installed on a selected client computer, referred to herein as "a golden computer," to one or more client computers within a computer network within a computer network. Hence, system provisioning provides a solution for ensuring a uniform environment. However, the system may be updated periodically; e.g., installing a new driver or a new software. Unfortunately, to maintain the uniform environment, system provisioning requires deployment of a complete software configuration image to one or more client computers within a computer network to maintain the uniform environment. In other words, a complete software configuration image must be generated each time a new portion of software, or a driver, is added to the a client computer of the network.

BRIEF DESCRIPTION OF THE DRAWINGS

The various embodiments of the present invention are illustrated by way of example, and not by way of limitation, in the figures of the accompanying drawings and in which.

DETAILED DESCRIPTION

In the following description, numerous specific details such as logic implementations, sizes and names of signals and buses, types and interrelationships of system components, and logic partitioning/integration choices are set forth to provide a more thorough understanding. It will be appreciated, however, by one skilled in the art that the embodiments described may be practiced without such specific details. In other instances, control structures and gate level circuits have not been shown in detail to avoid obscuring the invention. Those of ordinary skill in the art, with the included descriptions, will be able to implement appropriate details without undue experimentation.

Figure 1:
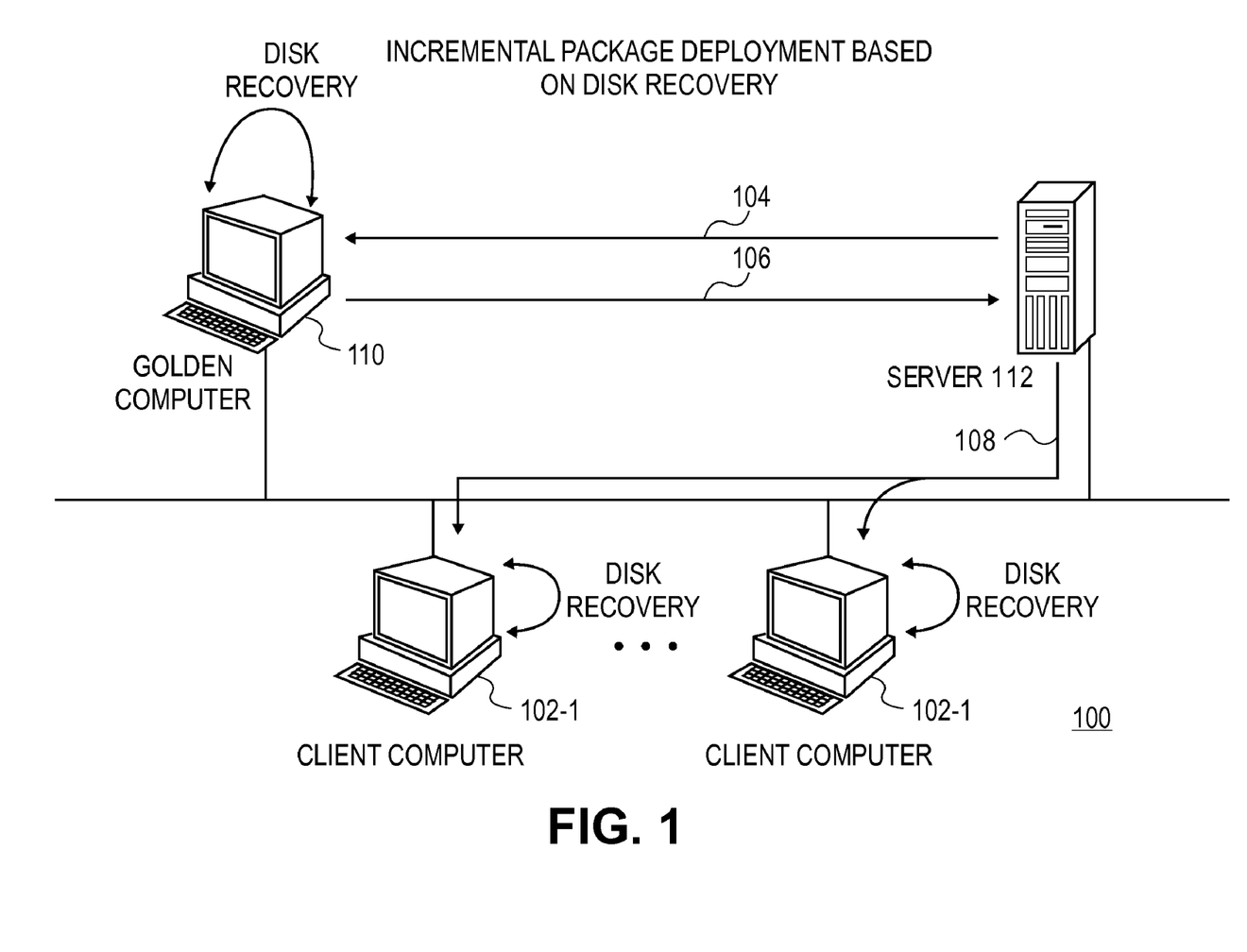
FIG. 1 is a block diagram illustrating incremental package deployment within a uniform environment computer network, in accordance with one embodiment.

FIG. 1 is a block diagram illustrating incremental package deployment within a uniform environment computer network 100, in accordance with one embodiment. As described herein, incremental package deployment refers to a technique for incrementally deploying software to pre-deployed systems of a uniform environment. As described herein, the term "uniform environment" refers to computer networks wherein the same software configuration is installed on one or more client computers in a computer network. In one embodiment, incremental package deployment is based on disk input/output (I/O) monitoring and protection.

Representatively, FIG. 1 illustrates computer network 100, including a plurality of client computers 102 (102-1, ..., 102-N), a selected computer referred to herein as a "golden computer" 110 and a server computer 112. In one embodiment, golden computer 110 is installed with a disk I/O protection component. As is described with reference to FIG. 2, in one embodiment, this disk I/O protection component records the operations of software installation and configuration changes while maintaining the original contents of disk memory.

As shown in FIG. 1, client computers 102 are pre-deployed with the original software configuration image of golden computer 110. Accordingly, client computers 102 and golden computer 110 conform to a uniform environment in which the same software configuration is installed on all client computers 102. In one embodiment, the disk I/O protection component of golden computer 110, in response to an incremental package creation command received from a server computer 112, as shown as transition arrow 104, causes golden computer 110 to generate an incremental package, which is based on redirected I/O operations performed during system operation by a disk I/O redirection component, as described with reference to FIG. 2.

As described herein, "system provisioning" refers to a technique for deploying the software configuration image from an a selected client computer referred to herein as a "golden computer," to one or more other client computers to cause the client computers to operate according to, or maintain, a uniform environment, for example, as shown in computer network 100 of FIG. 1. Referring again to FIG. 1, in one embodiment, following creation of the incremental package, this incremental package is sent to server computer 112, as shown by transition 106. In one embodiment, the term "incremental package" refers to, for example, an incremental disk image based on dirty block information of disk memory for redirected I/O write requests. As described herein, the term "disk memory" refers to non-volatile storage, such as, for example, the internal hard drive of a computer system.

As shown in FIG. 1, once the incremental package is received by server computer 112, the server computer 112 deploys the incremental package to client computers 102. As described below, in one embodiment, the boot-up processes of client computers 102 is modified to cause a firmware module, following a back-up of the current contents of disk memory to establish a previous checkpoint (for system recovery), commits changes indicated by the incremental package to disk memory of the respective client computer 102 and establishes a default checkpoint during disk recovery, as described below.

Accordingly, following committing of the changes indicated by the incremental package, client computers 102 and golden computer 110 once again conform to a uniform environment in which the same software configuration is installed on client computers 102 and golden computer 110. Accordingly, although golden computer 110 may be updated periodically by installing, for example, new software or a new driver, in one embodiment, incremental package deployment provides a solution to incrementally deploy the changes on golden computer 110 to client computers 102, rather than deploying an entire software configuration image to client computers 102 for each change to golden computer 110.

Figure 2:
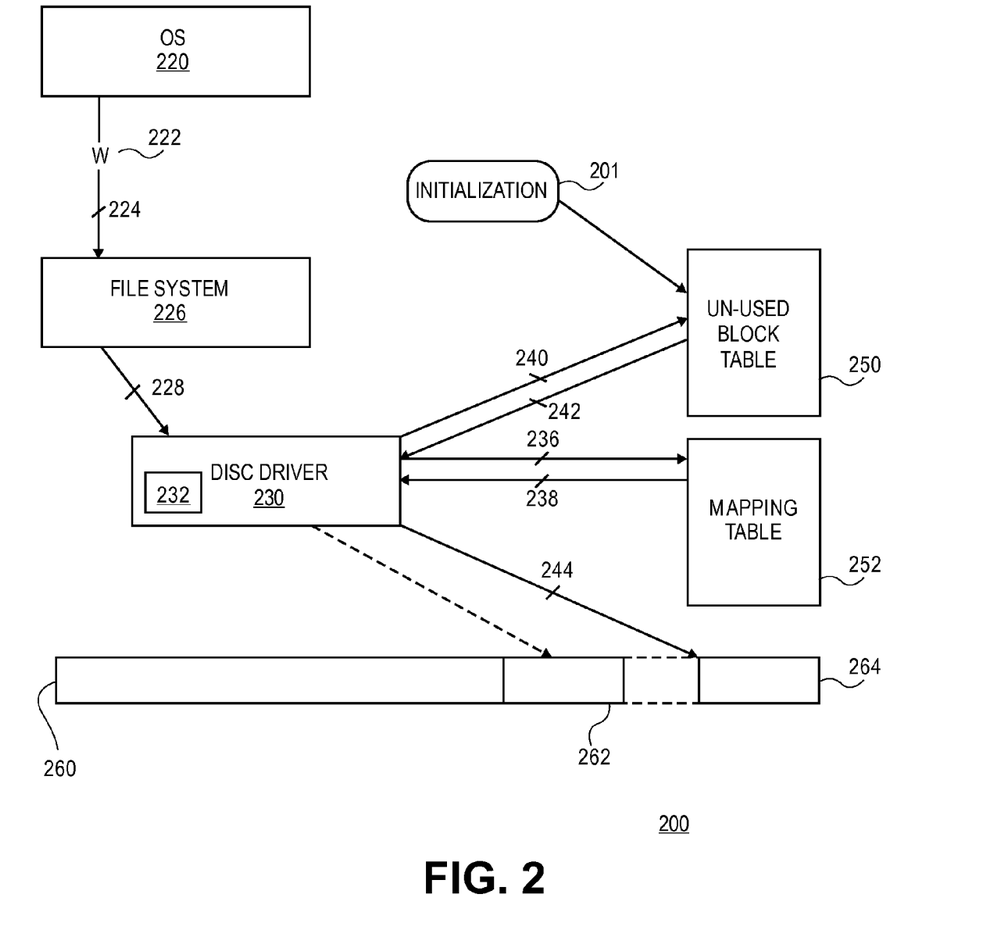
FIG. 2 is a block diagram illustrating redirection of detected input/output (I/O) write requests to unused blocks of disk memory to preserve the contents of disk memory, in accordance with one embodiment.

FIG. 2 is a block diagram illustrating redirection of detected I/O write requests 222 to preserve the contents of disk memory 260, in accordance with one embodiment. In one embodiment, disk driver 230 includes a disk I/O redirection component 232. Disk I/O monitoring and protection is an important requirement in uniform environments, for example, as illustrated in FIG. 1. In operation, users can conduct harmful operations on the system, which may cause the system to become unstable. As described herein, any changes based on operations conducted by normal users are referred to as "daily usage" and are not committed to disk memory.

In one embodiment, redirection component 232 of disk driver 230 redirects I/O requests issued by operating system (OS) 220 to unused portion of disk memory to preserve the contents of disk memory 260. In one embodiment, redirection component 232 records information regarding redirected I/O write requests issued by OS 220, such as which blocks are modified and the original and new contents of disk memory. In one embodiment, such changes may be authorized, for example, based on software installation by an administrator. In one embodiment, authorized changes are incrementally provisioned to client computers, for example, within a uniform environment, such as shown in FIG. 1, once committed on the golden computer 110. Otherwise, the changes are identified as daily usage, causing a recovery following system restart to a default checkpoint as part of disk recovery during boot-up of a respective client computer.

As described herein, "disk recovery" describes a modification to the boot-up process of, for example, client computers 102 and golden computer 110 as shown in FIG. 1 to determine whether a mapping table detected during system boot-up contains authorized software configuration changes. In one embodiment, authorized software configuration changes are indicated by transmission of an incremental package of creation command from a server computer to a selected golden computer.

As shown in FIG. 1, in one embodiment, golden computer 110 is simply a client computer 102 that has been selected by a system administrator to perform software configuration changes. Following the desired software configuration changes, the administrator may cause server computer 112 to send an incremental package creation command to golden computer 110. In response to receiving the command, golden computer 110 restarts and performs disk recovery in an incremental package creation mode.

As described herein, incremental package creation mode is a disk recovery mode wherein a firmware module recognizes redirected I/O request contained in mapping table 252 as authorized software configuration changes. In one embodiment, as part of the disk recovery, following a backup of the current contents of disk memory to establish a previous checkpoint (for system recovery), the firmware module commits software configuration changes indicated by the received incremental package to disk memory of the golden computer. As part of the process, golden computer 110 generates an incremental package as described in further detail below.

As described herein, disk recovery includes a standard disk recovery mode and the incremental package creation disk recovery mode, as described above. As described herein, the standard disk recovery mode describes a process during system start-up wherein firmware of either the golden computer or client computers identifies information within the mapping table as daily usage. Also, as part of the standard disk recovery, the firmware module discards the mapping table and deletes any write data associated with redirected I/O write requests from disk memory.

Referring again to FIG. 2, during daily operations, users may use computers, for example, such as client computers 102 of FIG. 1. In one embodiment, the I/O operations conducted by the users are monitored by redirection component 232 of disk driver 230. In one embodiment, disk driver 230 interrupts each write operation issued by operating system (OS) 220. In one embodiment, modifications to the destination blocks 262 of disk memory 260, or the hard disk, are not committed. Representatively, modifications to original (destination) blocks 262 of disk memory 260 are redirected to some other unused (redirected) blocks 264 of disk memory 260, and mapping table 252 is updated to list information regarding the redirected relations between the initial destination blocks 262 and redirected blocks 264 of disk memory 260.

To enable redirection of the detected write requests to preserve the contents of disk memory, initialization block 201 initially generates unused block table 250. In one embodiment, during disk recovery, initialization block 201 collects information regarding unused blocks of disk memory 260. In one embodiment, during initialization, a bit map is calculated which specifies a list of sectors on the hard disk and whether the sector is used or not used. In one embodiment, the bit map may be generated by referring to used sectors with a logical one value and unused sectors with a logical zero value. As part of the initialization process, initialization block 201 may generate a hidden partition within disk memory 260 to store unused block table 250, as well as mapping table 252.

TABLE 1

| Destination Block | Redirected Block |
|---|---|
| 0x3F → | 0x708E |
| 0x5B → | 0x708C |
| 0x5C → | 0x708D |

Referring again to FIG. 2, as indicated by transition 224, OS 220 may issue a write operation 222 to file system 226 directed to destination block 262. In one embodiment, redirection component 232 of disk driver 230 interrupts the detected write operation 222. As indicated by a transition 240, disk driver 230 looks for an unused block of disk memory 260 within unused block table 250 for use as a redirected block 264. In response to the query, as indicated by transition 242, disk driver 230 locates an unused block of disk memory 260 for use as a redirected block 264. As indicated by transition 236, disk driver 230 generates an entry in mapping table 252 to include a logical block address of the destination block 262 and a logical block address of the redirected block 264, for example, as shown in Table 1. Representatively, as shown by transition 244, rather than storing write data associated with the write operation 222 within the destination block 262, the data is redirected and stored within redirected block 264 to preserve the contents of the disk memory 260.

Figure 3:
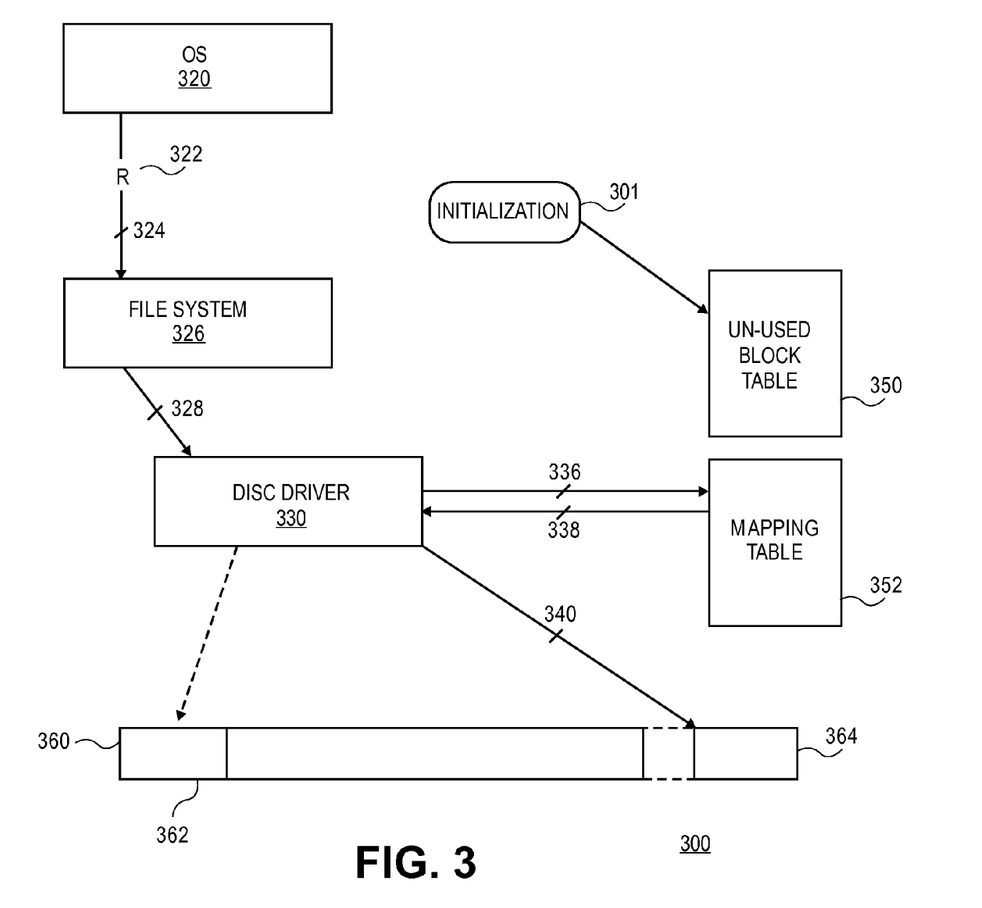
FIG. 3 is a block diagram illustrating processing of read requests issued to redirected blocks of disk memory, in accordance with one embodiment.

FIG. 3 is a block diagram illustrating processing of a read operation 322 directed to a destination block 362 of disk memory 360, which has been redirected to a redirected block 364 of disk memory 360. Representatively, the OS 320 may issue a read operation 322 to file system 326, as indicated by transition 324. In response, as indicated by transition 328, in one embodiment, disk driver 330 interrupts the read operation 322 to determine whether a read block associated with the read operation 322 is listed as a destination block 362 within mapping table 352, as indicated by transition 336. As indicated by transition 338, in one embodiment, mapping table 352 returns a logical block address of the redirected block 364 to which the read operation 322 is directed. At transition 340, disk driver 330 completes the read operation 322 using the redirected block 364 as a source block for the read operation 322. Otherwise, if the read block is not listed in the mapping table, disk driver 330 completes the read request to the requested read block 362.

Accordingly, as illustrated in FIG. 3, when read operation 322 is issued by the OS 320, a query through mapping table 352 is conducted. If the blocks to be read are redirected, then the read operations go to the redirected blocks 364. Otherwise, the read operations are conducted as usual. Accordingly, in one embodiment, as illustrated with references to FIGS. 2 and 3, the original content of disk memory 360 is preserved. However, from the perspective of the user as illustrated with reference to FIG. 3, the system behaves as if the operations are conducted as usual and from the user's perspective, it would appear that the disk I/O write requests are committed to disk memory.

Figure 4:
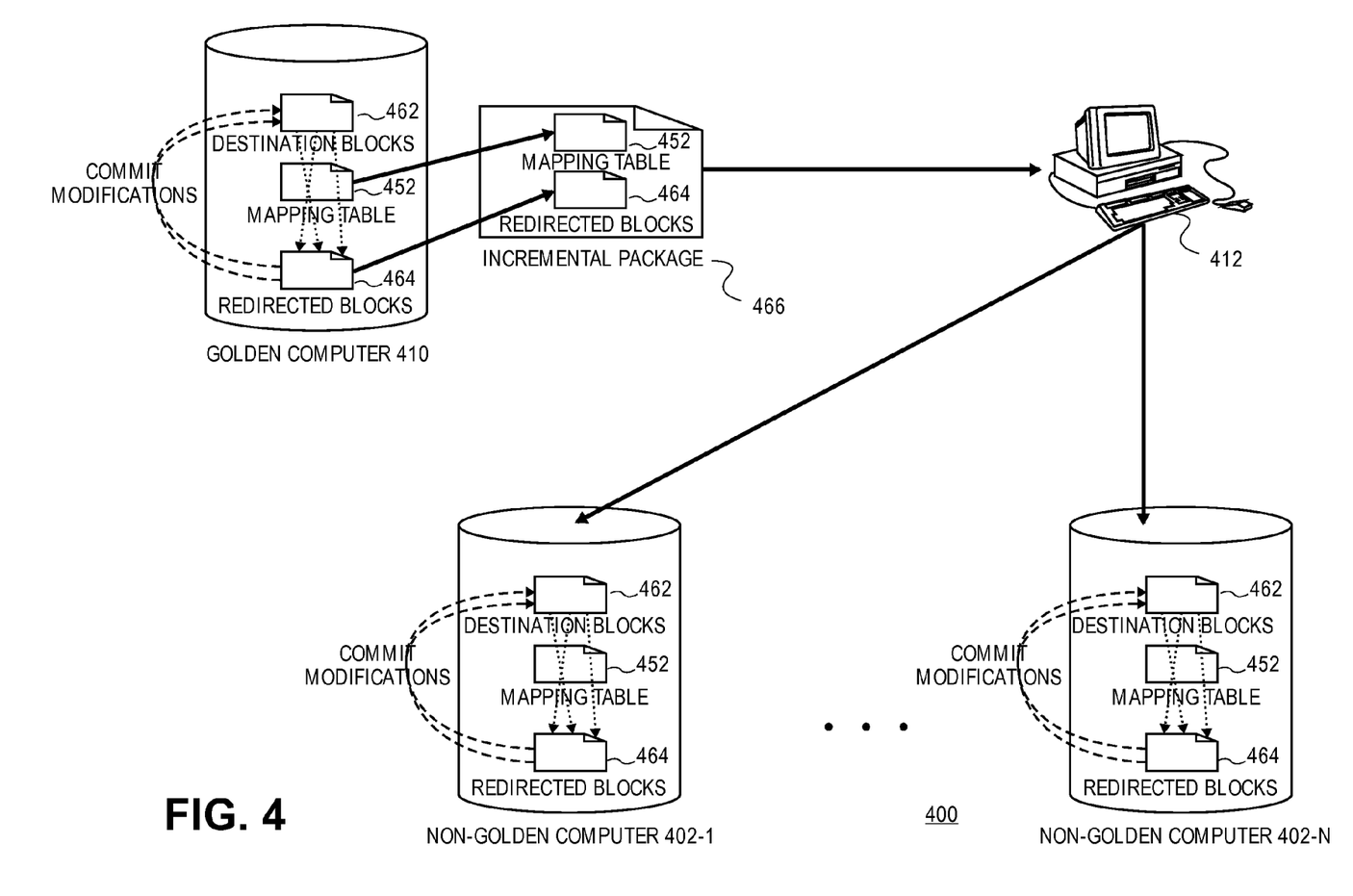
FIG. 4 is a block diagram illustrating incremental package deployment within a uniform environment computer network, in accordance with one embodiment.

FIG. 4 is a block diagram illustrating incremental package deployment, in accordance with one embodiment. Representatively, golden computer 410, following system restart, performs a disk recovery according to the standard disk recovery mode wherein the map table 452 recording the redirection information is discarded and the system restores to its original state. Accordingly, following system reset, in one embodiment, during disk recovery, unless the golden computer 410 or any other client computer 402 receives a command from the server computer 412 to generate an incremental package, the computer, as part of the disk recovery, discard the mapping table 452 and restores the system to its original state by discarding information written to redirected blocks 464 of disk memory 460.

Referring again to FIG. 4, when the administrator wants to upgrade the systems, a golden computer 410 is selected to apply software configuration changes, which may include installation/unstallation of software configuration changes, driver installation or the like. While these operations are conducted, all contents and modifications to disk memory of the golden computer 410 are redirected to redirected blocks, and mapping table 452 to record the redirection information is maintained by the disk I/O redirection component. In one embodiment, in response to a command from server computer 412, golden computer 410 generates an incremental package 466, which in one embodiment contains the mapping table 452 and the contents in the redirected blocks 464.

In one embodiment, firmware of the golden computer ("redirection firmware"), during disk recovery, generates the incremental package 466 and uploads the incremental package 466 to server computer 412. In addition, the golden computer 410 commits write data within redirected blocks 464 to initial destination blocks 462 of its disk memory according to mapping table 452. In one embodiment, redirection firmware creates a default checkpoint once the write data is committed to disk memory. In one embodiment, the redirection firmware may generate a previous checkpoint by saving the contents of disk memory prior to committing the write data, indicated by map table 452, to enable recovery of a system state to the previous checkpoint, prior to committing the changes. Representatively, incremental package 466 is deployed to non-golden computers 402 of uniform environment computer network 400, in accordance with one embodiment.

Firmware, as used herein, refers to processor routines that are stored in non-volatile memory structures, such as read only memories (ROMs), flash memories, and the like. These memory structures preserve the code stored in them even when power is shut off. Even through firmware is stored in non-volatile memory, firmware may be copied or shadowed to volatile memory. Typically, this is done for performance reasons. One of the principle uses of traditional firmware is to provide necessary instructions or routines that control a computer system when it is powered up from a shut down state, before volatile memory structures have been tested and configured. Firmware routines may also be used to reinitialize or reconfigure the computer system following various hardware events and to handle certain platform events, such as system interrupts.

During disk recovery by client (non-golden) computers 402 (402-1, . . . , 402-N), the redirection firmware of non-golden computers 402 commit modifications to redirected blocks of disk memory to the original destination blocks of disk memory according to the logical block addresses indicated by map table 452. Accordingly, once the mapping table information and destination blocks are committed by redirection firmware of the non-golden computers 402, a software configuration of non-golden computers 402 matches a software configuration to golden computer 410 to maintain computer network 400 as a uniform environment, in accordance with one embodiment. In one embodiment, the non-golden computer may set the system state following updating according to the incremental package as a default checkpoint.

In one embodiment, redirection firmware from the golden computer 410, as well as the non-golden computers 402, may receive a checkpoint request. In response to receiving a checkpoint request, during disk recovery, the redirection firmware may generated a back-up to preserve the contents of disk memory as a previous checkpoint. Once the contents of disk memory are backed-up, the redirection firmware commits disk I/O write requests that have been redirected to unused blocks of disk memory to the original destination blocks of disk memory. Once the various redirected write requests are committed to memory, the redirection firmware may create a new checkpoint as a default checkpoint while maintaining back-up information to perform recovery to the previous checkpoint if a subsequent checkpoint request is received.

Accordingly, as described above, in response to receive of an incremental package, in one embodiment, the redirection firmware takes the current state as a previous checkpoint and backs-up information according to the current state to enable recovery to the previous checkpoint and following commission of write data associated with the received increment package sets the new state as a default checkpoint. In one embodiment, the default checkpoint allows the redirection firmware to discard changes that are identified as daily usage, such that redirected write requests or I/O requests are discarded, and any data stored within unused blocks is deleted to restore memory back to the default checkpoint.

Figure 5:
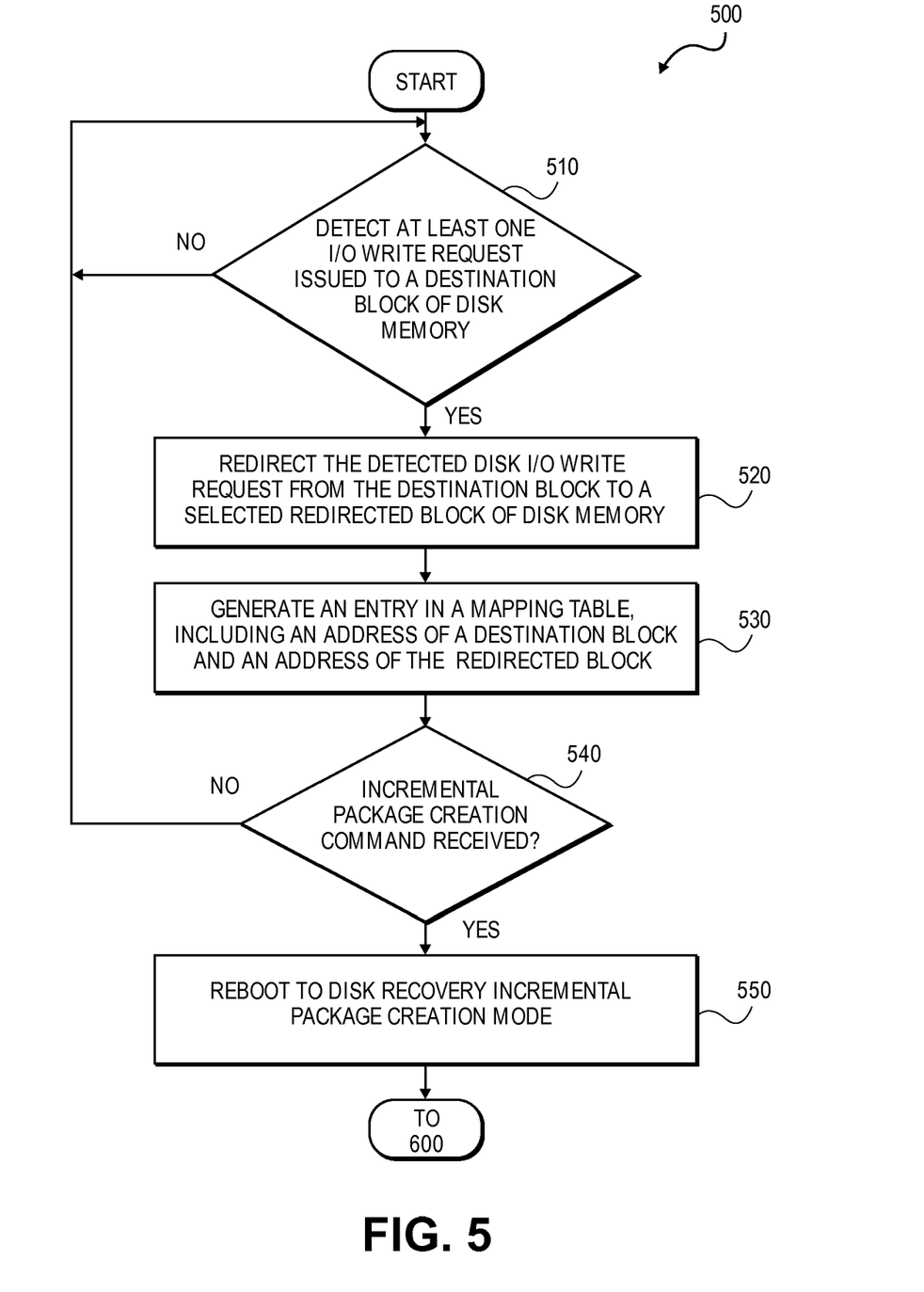
FIG. 5 is a flowchart illustrating redirection of detected disk I/O write requests to preserve the contents of disk memory, in accordance with one embodiment.

FIG. 5 is a flowchart illustrating a method 500 for redirecting detected I/O write requests to preserve the contents of disk memory by generating a mapping table, including redirection information, in accordance with one embodiment. At process block 510, it is determined whether an I/O write request issued to a destination block of disk memory is detected. As illustrated with reference to FIG. 2, the detected I/O write request may be issued by the OS 220 to a file system 220. In one embodiment, each I/O request issued by the operating system is interrupted to determine whether the request is an I/O read or write request.

At process block 520, the detected I/O write request is redirected from a destination block of disk memory to which the I/O request is issued to a selected, redirected block of disk memory wherein the detected write request is redirected to preserve the contents of disk memory. Following redirection, at process block 530, an entry in a mapping table is generated. In one embodiment, the entry includes an address of the destination block of disk memory and an address of the selected, redirected block of disk memory.

In one embodiment, the address refers to a logical block address, which identifies the sectors in a hard disk by logically referring to the sectors in the hard disk with a linear address (See, Table 1). In one embodiment, the mapping table, as well as other redirection information, is contained within a hidden partition of disk memory. In one embodiment, the location of the hidden partition of disk memory is communicated by, for example, a disk driver to, for example, firmware of the computer system, which is invoked during system boot-up, as part of disk recovery.

In one embodiment, as shown in FIG. 5, at process block 540, it is determined whether an incremental package creation command is received. If an incremental package creation command is not received at process block 540, process blocks 510-530 are repeated until an incremental package creation command is received or system shutdown is detected. If an incremental package creation command is received at process block 540, in one embodiment, the selected golden computer, to which system configuration changes are being performed, reboots the golden computer to operate according to a disk recovery incremental package creation mode as indicated at process block 550. As described above, disk recovery incremental package creation mode describes a mode wherein firmware of a golden computer identifies a map table, detected during system start-up, as including authorized software configuration changes. In one embodiment, the firmware performs the generation of an incremental package as illustrated with reference to FIG. 6.

Figure 6:
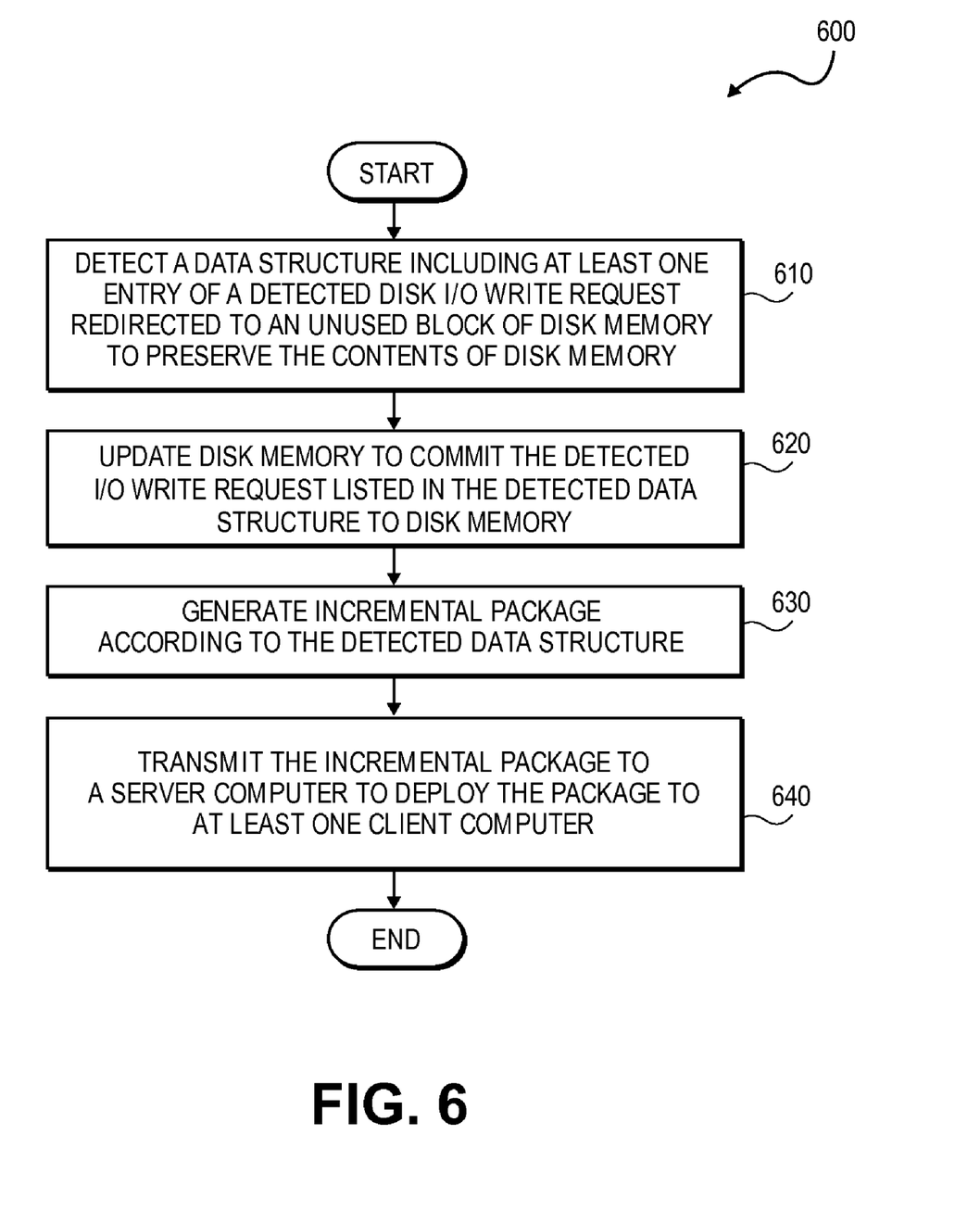
FIG. 6 is a flowchart illustrating a method for incremental package deployment within a uniform environment computer network, in accordance with one embodiment.

FIG. 6 is a flowchart illustrating a method 600 for generating an incremental package and deploying the incremental package to one or more client computers, in accordance with one embodiment. At process block 610, a data structure is detected, which includes at least one entry listing information regarding a detected disk I/O write request redirected to an unused block of disk memory to preserve the contents of disk memory. In one embodiment, during disk recovery, in response to receipt of, for example, an incremental package creation command from a server computer, a firmware module updates disk memory to commit the detected I/O write request listed in the data structure to disk memory.

In one embodiment, the command may be received following completion of the software configuration changes to cause the golden computer to reboot according to an incremental package creation mode. In one embodiment, the command may be received during disk recovery. However, if the command is not received, the information in the data structure is identified as daily usage, such that the data structure is discarded and any data within redirected blocks indicated by the data structure is deleted to restore the system to a default checkpoint.

At process block 630, an incremental package is created according to the data structure. In one embodiment, as illustrated with reference to FIG. 4, the incremental distribution package includes a mapping table including a logical block address of an original or destination block of each redirected write request, a logical block address of the redirected block of disk memory to which the write request is redirected, as well as data associated with the write request. Once generated, the incremental package is transmitted to a server computer at process block 640. In one embodiment, the server computer deploys the packets to at least one client computer. Accordingly, once the incremental package is deployed to at least one client computer, the at least one client computer and a golden computer will have a matching system image.

Figure 7:
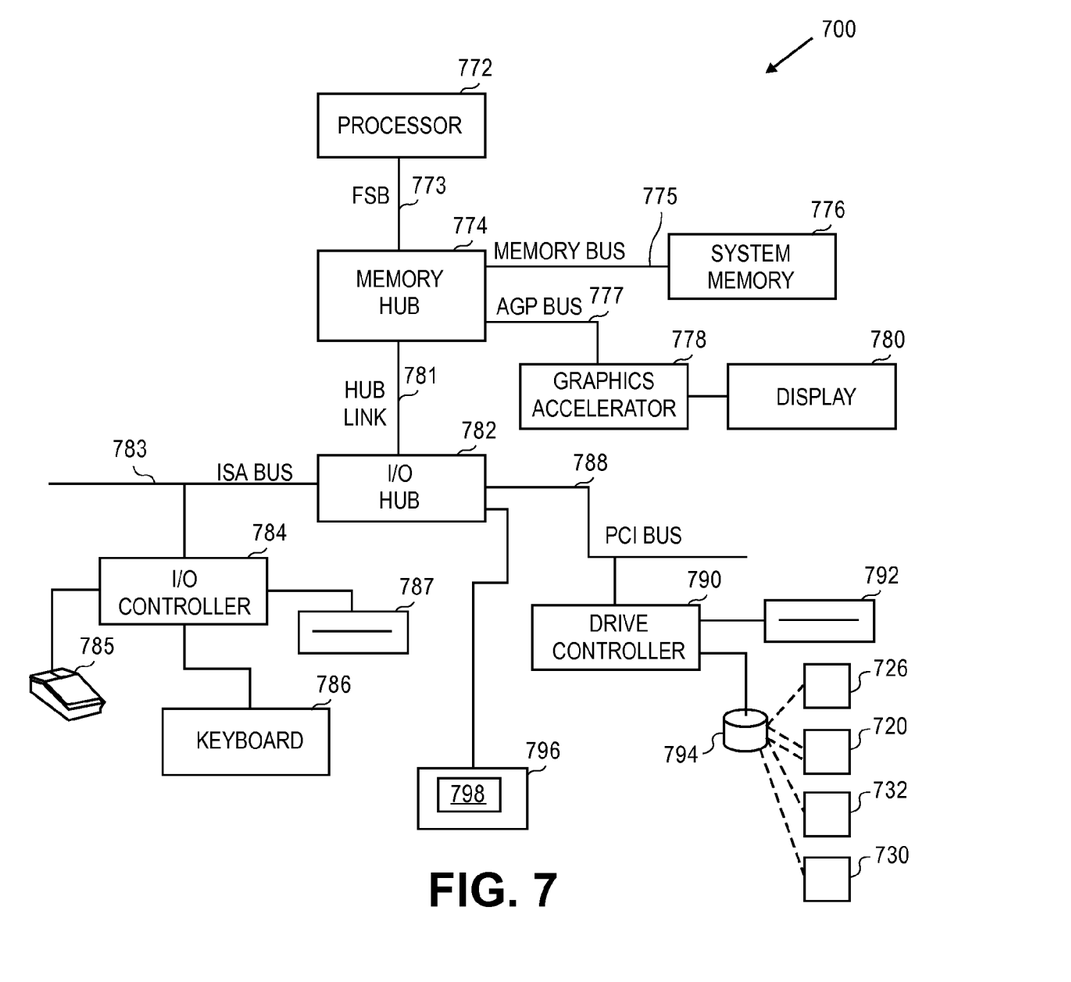
FIG. 7 is a schematic diagram of a computer system for use within the client computers and server computer of FIG. 1, in accordance with one embodiment.

Referring to FIG. 7, an exemplary computer system 700 that may implement incremental package deployment may include a processor 772 that communicates to the rest of the system 700 via a north bridge circuit also referred to as a "memory hub" 774. In some embodiments, the processor 772 may serve as the bootstrap processor and may execute the boot code to load an operating system. Besides providing a front side bus (FSB) 773 to the processor 772, the memory hub 774 may also provide an interface to a memory bus 775, a graphics bus 777, such as an Accelerated Graphics Port (AGP) bus or other follow on graphics bus and a hub link 781. A system memory 776 may be coupled to the memory bus 775, and a graphics accelerator 778 may be coupled to the graphics bus 777. The graphics accelerator 778 furnishes signals to control a display 780.

The memory hub 774 may communicate with a south bridge circuit, or input/output (I/O) hub 782, via the hub link 781. The I/O hub 782 may provide an interface to an I/O expansion bus 783, such as an industry standard architecture (ISA) bus, and peripheral bus 788, such as a Peripheral Component Interconnect (PCI) bus, or follow on bus including PCIx, PCI express or the like. An I/O controller 784 is coupled to the I/O expansion bus 783 and receives input from a mouse 785 and a keyboard 786. The I/O controller 784 may also control operations of a floppy disk drive 787. A drive controller 790 may be coupled to the PCI bus 788 and may control operations of a compact disk-read only memory (CD-ROM) drive 792 and a hard disk drive 794, as examples. In one embodiment, the disk driver 730, the I/O redirection disk component 732, the OS 720 and file system 726 may be stored on the hard disk drive 794. In this manner, the hard disk drive 794 may serve as the bootup device.

In one embodiment, computer system 700 includes, for example, non-volatile memory 796 to store one or more firmware modules including redirection firmware 798. In one embodiment, redirection firmware functionality is provided by extensible firmware interface (EFI) in conjunction with system abstraction layer (SAL) firmware and processor abstraction layer (PAL) firmware. In one embodiment, the non-volatile memory 796 includes flash memory, an electrically erasable and programmable read only memory (EEPROM), or any other suitable non-volatile memory. In one embodiment, non-volatile memory stores redirection firmware 798 which communicates with the disk driver 730 to generate an incremental package in response to an incremental package creation command received from the server computer and a mapping table.

Accordingly, in one embodiment, a disk I/O monitoring and protection component is combined with system provisioning as a new approach for incremental package deployment. As described in one embodiment, a disk I/O and monitoring component, for example, as illustrated with reference to FIGS. 1 and 3 on a golden computer provides notice of changes; e.g., which blocks are modified and what is the original and new content. When this new content is committed to disk memory of the non-golden computer (as well as the golden computer), the changes are incrementally provisioned to maintain a uniform environment, in accordance with one embodiment.

ALTERNATE EMBODIMENTS

It will be appreciated that, for other embodiments, a different system configuration may be used. For example, while the system 700 includes a single CPU 772, for other embodiments, a multiprocessor system (where one or more processors may be similar in configuration and operation to the CPU 772 described above) may benefit from the incremental package deployment of various embodiments. Further different type of system or different type of computer system such as, for example, a server, a workstation, a desktop computer system, a gaming system, an embedded computer system, a blade server, etc., may be used for other embodiments.

Having disclosed embodiments and the best mode, modifications and variations may be made to the disclosed embodiments while remaining within the scope of the embodiments as defined by the following claims.

What is claimed is:

1. A method comprising:
   redirecting a detected disk input/output (I/O) request to an unused block of a disk memory to preserve contents of the disk memory of a first client computer;
   generating an incremental package, the incremental package including an address of a destination block of the detected disk I/O request, an address of the unused block of the detected I/O request, and data associated with the detected I/O request; and
   deploying the incremental package to a second client computer that is different from the first client computer.

2. The method of claim 1, wherein redirecting further comprises:
   detecting a write request;
   transferring the write request to the destination block of the disk memory;
   selecting the unused block of the disk memory as a redirected block to store write data associated with the write request; and
   storing the write data associated with the write request within the selected unused block of the disk memory.

3. The method of claim 2, further comprising:
   detecting a read request issued by an operating system;
   determining whether the address of a read block of disk memory associated with the read request is listed within a mapping table;
   if the read block of the disk memory is listed in the mapping table, then completing the request by means of a destination block associated with the read block within the mapping table.

4. The method of claim 1, wherein prior to redirecting, the method further comprises:
   collecting information regarding the unused block of the disk memory; and
   generating a hidden disk partition to store the information for redirecting the detected I/O request in order to maintain original contents of the disk memory.

5. The method of claim 1, further comprising:
   detecting a checkpoint request;
   generating a backup to preserve the contents of the disk memory;
   committing the disk I/O request to the unused block of the disk memory; and
   creating a new checkpoint according to the detected checkpoint request as a default checkpoint.

6. The method of claim 1, wherein deploying the incremental package further comprises:
   transmitting the incremental package to a server computer.

7. The method of claim 1, wherein generating the incremental package comprises:
   detecting, during system start-up, a data structure indicating the detected disk I/O request.

8. The method of claim 1, wherein prior to generating the incremental package, the method comprises:
   generating an incremental disk image based on dirty block information loaded within the disk memory of the first client computer;
   uploading the incremental disk image of the first client computer to an administration server; and
   deploying, by the administration server, the incremental disk image of the first client computer to at least one client computer, wherein the one client computer is the first client computer or the second client computer that is different from the first client computer.

9. The method of claim 1, further comprising:
   storing the redirected disk I/O request to initial destination blocks of the disk memory.

10. The method of claim 1, further comprising:
    detecting, following system restart, a data structure including a listing of detected disk I/O requests redirected to the unused block of the disk memory;
    disregarding the detected data structure if the detected I/O requests are identified as daily usage, wherein daily usage are any changes based on operations conducted by normal users; and
    storing the detected I/O requests if the detected data structure is identified as authorized system configuration changes.

11. A system comprising:
    a plurality of client computers; and
    a server computer, the server computer to send an incremental software distribution command to a first client computer, wherein the first client computer to:

redirect a detected input/output (I/O) request to an unused block of a disk memory of the first client computer to preserve the contents of the disk memory of the first client computer, generate an incremental package according to the detected disk I/O request, the incremental package including an address of a designation block of the detected I/O request, an address of the unused block of the detected I/O request, and data associated with the detected I/O request, and transmit the incremental package to the server computer to deploy the package to at least one second client computer.

12. The system of claim 11, wherein the plurality of client computers further comprises:
a non-volatile memory in which is stored a firmware module to:
detect a checkpoint request,
generate a backup to preserve the contents of its corresponding disk memory,
commit the disk I/O request redirected to the unused block of the disk memory, and
create a new checkpoint according to the detected checkpoint request as a default checkpoint.

13. The system of claim 11, wherein each of the plurality of client computers further comprises:
a non-volatile memory in which is stored a firmware module to:
detect, following system restart, a data structure including a listing of detected disk I/O requests redirected to unused blocks of the disk memory,
disregard the detected data structure if the detected I/O request is identified as daily usage, and
commit the detected I/O request if changes indicated by the detected data structure are identified as authorized system configuration changes.

14. The system of claim 11, wherein the first client computer to generate an entry in a mapping table, including a logical block address of a destination block of the disk memory and a logical block address of the redirected block of the disk memory.

15. An article of manufacture comprising a non-transitory machine-accessible medium having associated data, that when accessed, result in a machine to perform operations, comprising:
redirecting a detected disk input/output (I/O) request to an unused block of a disk memory to preserve contents of the disk memory of a first client computer;
generating an incremental package, the incremental package including an address of a destination block of the detected disk I/O request, an address of the unused block of the detected I/O request, and data associated with the detected I/O request; and
deploying the incremental package to a second client computer that is different from the first client computer.

16. The article of manufacture of claim 15, wherein redirecting the detected disk I/O request comprises:
detecting a write request;
transferring the write request to the destination block of the disk memory;
selecting the unused block of the disk memory as a redirected block to store write data associated with the write request; and
storing the write data associated with the write request within the selected unused block of the disk memory.

17. The article of manufacture of claim 15, wherein non-transitory the machine-accessible medium further includes data that, when accessed, cause the machine to perform operations, comprising:
detecting a read request issued by an operating system;
determining whether the address of a read block of disk memory associated with the read request is listed within a mapping table;
if the read block of the disk memory is listed in the mapping table, then completing the request by means of a destination block associated with the read block within the mapping table.

18. The article of manufacture of claim 15, wherein prior to redirecting, the method machine to further perform operations, comprising:
collecting information regarding the unused block of the disk memory; and
generating a hidden disk partition to store the information for redirecting the detected I/O request in order to maintain original contents of the disk memory.

19. The article of manufacture of claim 15, wherein the non-transitory machine-accessible medium further includes data that, when accessed, cause the machine to perform operations, comprising:
detecting a checkpoint request;
generating a backup to preserve the contents of the disk memory;
committing the disk I/O request to the unused block of the disk memory; and
creating a new checkpoint according to the detected checkpoint request as a default checkpoint.

20. The article of manufacture of claim 15, wherein generating the incremental package comprises:
detecting, during system start-up, a data structure indicating the detected disk I/O request.

21. The method of claim 15, wherein the non-transitory machine-accessible medium further includes data that, when accessed, cause the machine to perform operations, comprising:
detecting, following system restart, a data structure including a listing of detected disk I/O requests redirected to the unused block of the disk memory;
disregarding the detected data structure if the detected I/O requests are identified as daily usage, wherein daily usage are any changes based on operations conducted by normal users; and
storing the detected I/O requests if the detected data structure is identified as authorized system configuration changes.

* * * * *